(12) United States Patent
Akamatsu et al.

(10) Patent No.: US 11,292,070 B2
(45) Date of Patent: Apr. 5, 2022

(54) WELDING TORCH AND ALL-POSITION WELDING DEVICE

(71) Applicant: KAWASAKI JUKOGYO KABUSHIKI KAISHA, Kobe (JP)

(72) Inventors: Masahiko Akamatsu, Himeji (JP); Shingo Yonemoto, Kakogawa (JP); Takanori Kozuki, Kakogawa (JP); Shinya Hibino, Kobe (JP); Yukio Ikezawa, Kobe (JP); Kenichiro Niimi, Kakogawa (JP); Akitsugu Arao, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 280 days.

(21) Appl. No.: 16/469,708

(22) PCT Filed: Dec. 14, 2017

(86) PCT No.: PCT/JP2017/044948
§ 371 (c)(1),
(2) Date: Jun. 14, 2019

(87) PCT Pub. No.: WO2018/110658
PCT Pub. Date: Jun. 21, 2018

(65) Prior Publication Data
US 2019/0351498 A1 Nov. 21, 2019

(30) Foreign Application Priority Data
Dec. 14, 2016 (JP) .............................. JP2016-242470

(51) Int. Cl.
*B23K 9/16* (2006.01)
*B23K 9/028* (2006.01)
(Continued)

(52) U.S. Cl.
CPC ............ *B23K 9/0282* (2013.01); *B23K 9/167* (2013.01); *B23K 9/296* (2013.01)

(58) Field of Classification Search
CPC .......... B23K 9/167; B23K 9/29; B23K 9/291; B23K 9/24; B23K 9/285; B23K 9/0282; B23K 9/16
See application file for complete search history.

(56) References Cited

U.S. PATENT DOCUMENTS

| 5,003,150 A | 3/1991 | Stricklen | |
|---|---|---|---|
| 5,393,949 A * | 2/1995 | Stricklen | B23K 9/167 219/74 |

(Continued)

FOREIGN PATENT DOCUMENTS

| JP | S57-085678 A | 5/1982 |
|---|---|---|
| JP | S62-061393 B2 | 12/1987 |

(Continued)

*Primary Examiner* — Brian W Jennison
(74) *Attorney, Agent, or Firm* — Oliff PLC (57) ABSTRACT

A welding torch includes a torch body including a flow path forming portion that forms a shielding gas flow path into which an inert gas flows and an outer gas flow path communicating with the shielding gas flow path, a first gas lens that straightens the inert gas in the shielding gas flow path and blows the inert gas out as a shielding gas, and a second gas lens that straightens the inert gas in the outer gas flow path and blows the inert gas out as an outer gas. Provided is an all-position welding device that performs butt welding of tubes, and includes the welding torch and a rotation mechanism for rotating the welding torch around the tube.

7 Claims, 9 Drawing Sheets

(51) Int. Cl.
 *B23K 9/167* (2006.01)
 *B23K 9/29* (2006.01)

(56) References Cited

U.S. PATENT DOCUMENTS

| | | | |
|---|---|---|---|
| 5,772,102 A * | 6/1998 | New | B23K 9/173 |
| | | | 219/137.42 |
| 6,525,288 B2 * | 2/2003 | Rehrig | B23K 9/167 |
| | | | 219/74 |
| 9,095,922 B1 * | 8/2015 | Shearin | B23K 9/326 |
| 9,338,873 B1 * | 5/2016 | Furick | H05H 1/34 |
| 2011/0173934 A1 * | 7/2011 | Burns | B01D 46/10 |
| | | | 55/307 |

FOREIGN PATENT DOCUMENTS

| | | |
|---|---|---|
| JP | 2001-225165 A | 8/2001 |
| JP | 2012-139704 A | 7/2012 |
| JP | 2015-174141 A | 10/2015 |

* cited by examiner

WELDING TORCH AND ALL-POSITION WELDING DEVICE

TECHNICAL FIELD

The present invention relates to a welding torch suitable for an all-position welding device that performs butt welding of tubes, and an all-position welding device including the welding torch.

BACKGROUND ART

Heretofore, an all-position welding device has been known which automatically performs butt welding between tubes. Such an all-position welding device may be used, for example, in the manufacture of an apparatus in which a plurality of tubes are arranged at a narrow pitch, such as a boiler panel. PTL 1 discloses a welding torch capable of passing through such a narrow gap as described above, and an all-position welding device including the welding torch.

The welding torch of PTL 1 includes a non-consumable electrode, a collet into which the non-consumable electrode is inserted, a torch body, and a highly rigid porous ring. The torch body has a ceiling wall which is penetrated by the collet, and a body which encloses the ceiling wall and a shielding gas flow path facing the collet. The porous ring is joined to the body of the torch body so as to close the shielding gas flow path, and has a tapered inner peripheral surface that comes into contact with the distal end of the collet. In this welding torch, the non-consumable electrode is held by the collet by the diameter of the distal end of the collet into which the non-consumable electrode is inserted being reduced by the inner peripheral surface of the porous ring.

CITATION LIST

Patent Literature

PTL 1: JP 2015-174141 A

SUMMARY OF INVENTION

Technical Problem

In order to finish a weld bead mark beautifully, an inert gas (called "outer gas") may be sprayed to a bead melted and solidified during welding. In the welding torch described in PTL 1, the nozzle that blows the outer gas is not provided.

An object of this invention is to provide a welding torch including an outer gas nozzle, and capable of achieving further size reduction.

Solution to Problem

A welding torch according to an aspect of the present invention includes a torch body including a flow path forming portion that forms a shielding gas flow path and an outer gas flow path communicating with the shielding gas flow path, a first gas lens that straightens a shielding gas in the shielding gas flow path and blows the shielding gas out, and a second gas lens that straightens an outer gas in the outer gas flow path and blows the outer gas out.

An all-position welding device according to an aspect of the present invention performs butt welding of tubes, and includes the welding torch and a rotation mechanism for rotating the welding torch around the tubes.

In the welding torch and the all-position welding device, the shielding gas flow path and the outer gas flow path communicate with each other, and part of an inert gas supplied to the welding torch as the shielding gas is used as the outer gas. That is, the inert gas supplied to the welding torch is carried to the outer gas flow path using part or all of the shielding gas flow path. As described above, since the shielding gas flow path and the outer gas flow path are not independent, the gas flow path can be shortened by sharing the flow path, and further, the joint portion connected to the hose for the outer gas can be omitted. Thus, the welding torch including the outer gas nozzle can be miniaturized.

Advantageous Effect of Invention

According to the present invention, it is possible to provide a welding torch including an outer gas nozzle, and capable of achieving further size reduction and an all-position welding device.

DESCRIPTION OF EMBODIMENT

Next, an embodiment of the present invention will be described with reference to the drawings. First, a schematic configuration of an all-position welding device 1 according to an embodiment of the present invention will be described.

[All-Position Welding Device 1]

Figure 1:
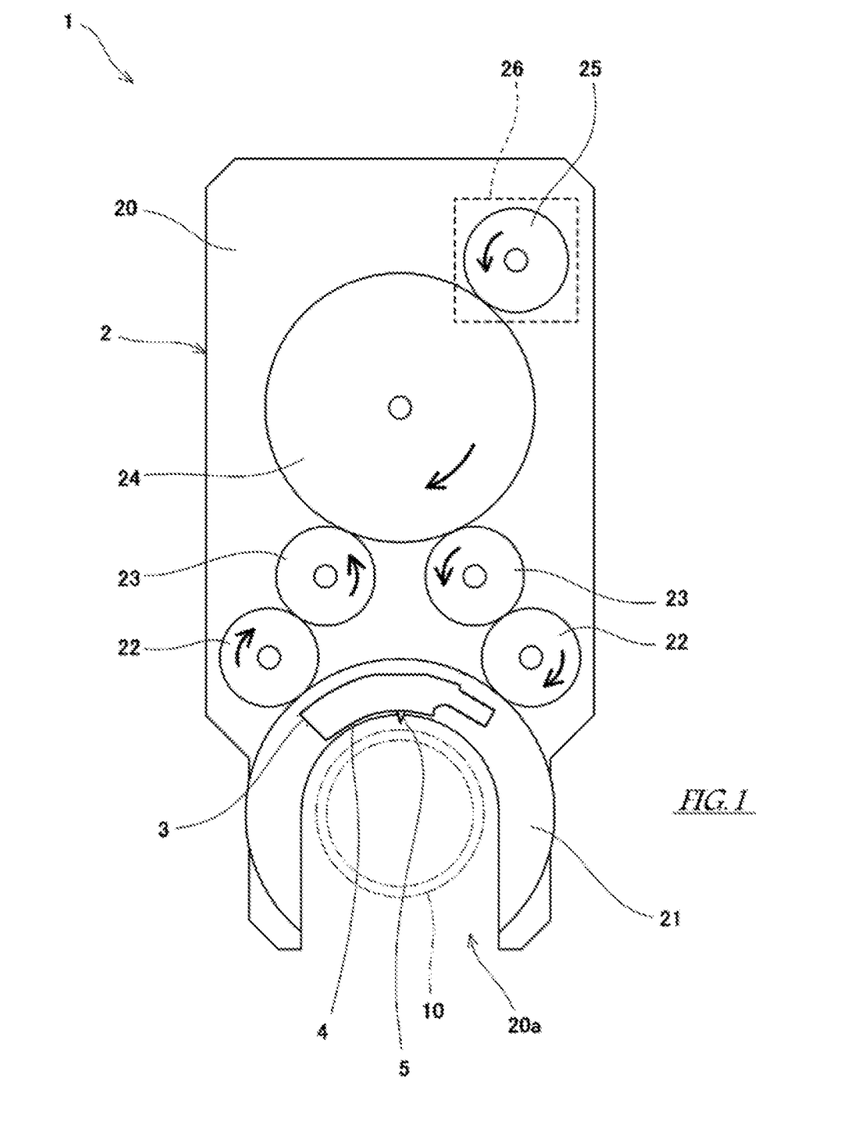
FIG. 1 is a front view of an all-position welding device equipped with a welding torch according to an embodiment of the present invention.
Figure 2:
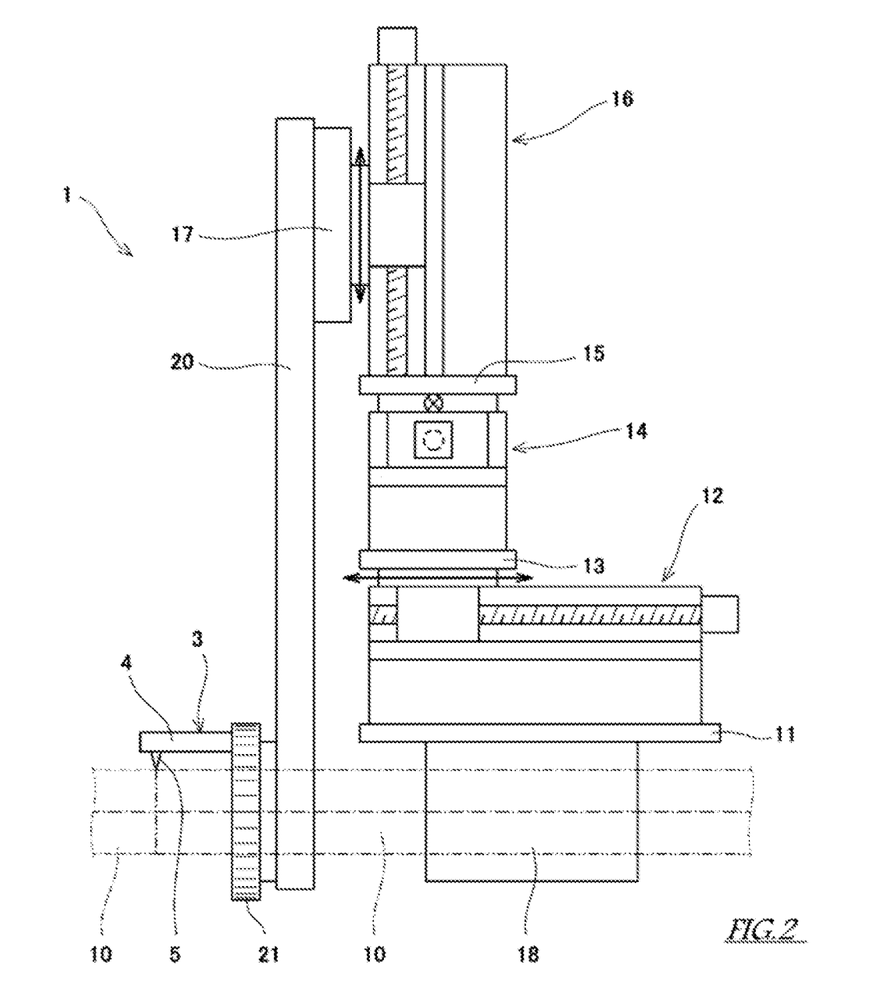
FIG. 2 is a side view of the all-position welding device shown in FIG. 1.

The all-position welding device 1 shown in FIGS. 1 and 2 automatically performs butt welding of tubes 10. The welding method may be, for example, tungsten inert gas (TIG) welding.

The welding device 1 includes a welding torch 3, a rotation mechanism 2 for rotating the welding torch 3 around the tube 10, and three linear motion mechanisms for moving the welding torch 3 in a three-dimensional manner (a first linear motion mechanism 12, a second linear motion mechanism 14 and a third linear motion mechanism 16).

The first linear motion mechanism 12 moves the welding torch 3 in the axial direction (e.g., the horizontal direction) of the tube 10, the second linear motion mechanism 14 and the third linear motion mechanism 16 move the welding torch 3 in mutually orthogonal directions (for example, the horizontal direction and the vertical direction) on the plane orthogonal to the axial direction of the tube 10. However, it is not always necessary to use three linear motion mechanisms in order to move the welding torch 3 in a three-dimensional manner. For example, instead of the second linear motion mechanism 14 and the third linear motion mechanism 16, a radial direction moving mechanism may be used which moves the welding torch 3 in the radial direction of the tube 10 with respect to a rotating member 21 described later. Alternatively, the welding torch 3 need not necessarily be moved in a three-dimensional manner, and may be moved in a two-dimensional manner on a plane orthogonal to the axial direction of the tube 10.

The first linear motion mechanism 12 is attached to a base plate 11 parallel to the axial direction of the tube 10. The base plate 11 is provided with a clamp mechanism 18 for clamping the tube 10. The second linear motion mechanism 14 is fixed to the movable portion of the first linear motion mechanism 12 via a mounting seat 13. The third linear motion mechanism 16 is fixed to the movable portion of the second linear motion mechanism 14 via a mounting seat 15. Naturally, the positions of the first to third linear motion mechanisms 12, 14 and 16 can be interchanged with each other.

The rotation mechanism 2 includes a plate-shaped table 20 orthogonal to the axial direction of the tube 10. The table 20 is fixed to the movable portion of the third linear motion mechanism 16 via a mounting seat 17. The substantially U-shaped rotating member 21 into which the tube 10 can be fitted is rotatably supported on the table 20. Further, the table 20 is also formed with a notch 20a into which the tube 10 can be fitted.

The rotating member 21 has an arc-shaped outer peripheral surface when viewed from the axial direction of the tube 10, and external teeth are formed on the outer peripheral surface. A motor 26 is attached to the table 20, on which a gear train is supported. The gear train transmits torque from a drive gear 25 fixed to the output shaft of the motor 26 to the rotating member 21. In FIG. 2, the gear train and the motor 26 are omitted to simplify the figure.

The gear train described above includes a large diameter first driven gear 24 engaging with the drive gear 25, a pair of second driven gears 23 engaging with the first driven gear 24, and a pair of third driven gears 22 engaging with the second driven gears 23 and the rotating member 21. With such a configuration, even if the opening of the rotating member 21 reaches one of the third driven gears 22, torque is transmitted to the rotating member 21 by the other third driven gear 22.

The welding torch 3 is fixed, for example, to the center of the rotating member 21 so as to project in the axial direction of the tube 10. The welding torch 3 includes a plate-shaped torch body 4 orthogonal to the radial direction of the tube 10 and a non-consumable electrode 5 supported by the torch body 4 via a collet 7.

The non-consumable electrode 5 is used for generating an arc between the non-consumable electrode 5 and a welding area of the tube 10. Here, the welding area is, for example, the bottom of the groove in the first layer and the previous layer in the second and subsequent layers when the groove is created at the joint of the tubes 10 and the welding layer is formed in many layers. A welding wire (not shown) is supplied from a wire supplying device (not shown) between the non-consumable electrode 5 and the welding area.

In the welding device 1 having the above configuration, the welding torch 3 is moved along the predetermined track by the first to third linear motion mechanisms 12, 14 and 16 while being rotated around the tube 10 by the rotation mechanism 2. At this time, the position of the welding torch 3 is finely adjusted by the first to third linear motion mechanisms 12, 14 and 16 so that the distance from the non-consumable electrode 5 to the welding area is a predetermined value.

The rotating member 21 has conductivity, the welding torch 3 including the torch body 4 and the non-consumable electrode 5 held thereby has conductivity, and the rotating member 21 supporting the welding torch 3 also has conductivity. Notches for tube insertion are formed at appropriate positions in the table 20 which makes the rotating member 21 rotatable. A power supply brush (not shown) which is continuously connected to the back surface of the rotating member 21 while the rotating member 21 rotates once is provided between the rotating member 21 and the table 20. In this manner, power is supplied to the welding torch 3 from the power supply brush via the rotating member 21. Therefore, the lines connected to welding torch 3 can be reduced, and the total thickness of the torch peripheral configuration can be reduced.

[Configuration of Welding Torch 3]

Figure 3:
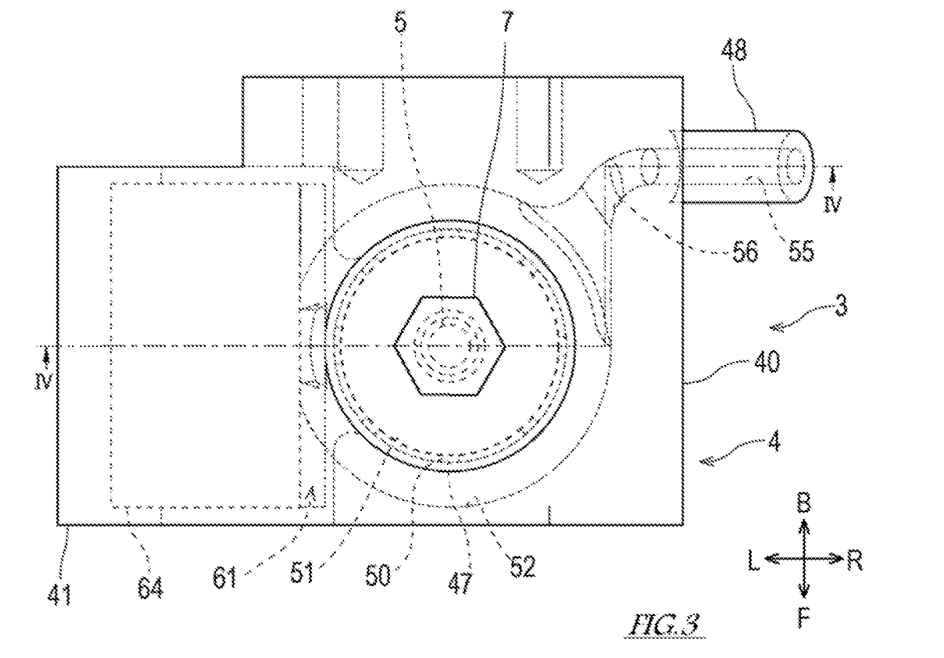
FIG. 3 is a plan view of a welding torch.

Here, the configuration of the welding torch 3 will be described in detail. FIG. 3 is a plan view of the welding torch 3, FIG. 4 is a sectional view taken along line IV-IV of FIG. 3, FIG. 5 is a sectional view taken along line V-V of FIG. 4, and FIG. 6 is a sectional view taken along line VI-VI of FIG. 4.

Figure 4:
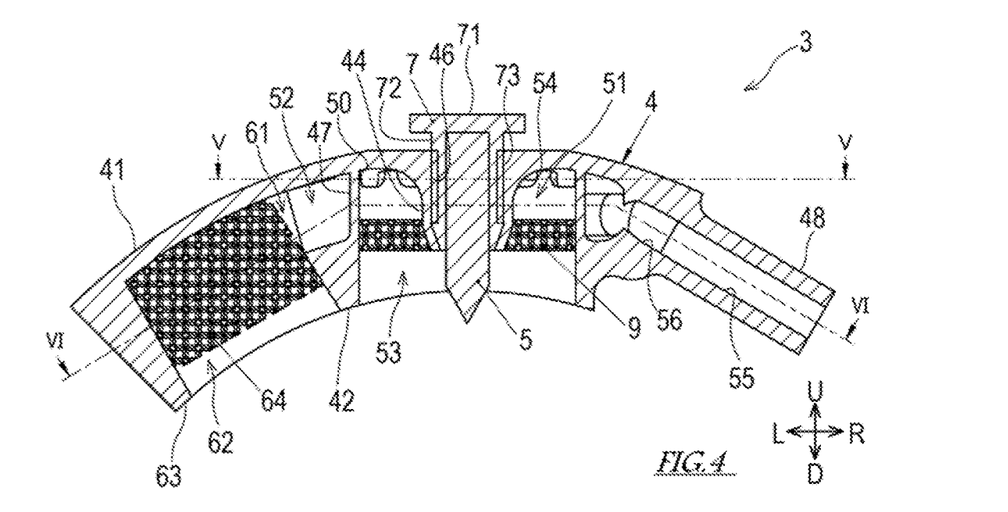
FIG. 4 is a sectional view taken along line IV-IV of FIG. 3.
Figure 5:
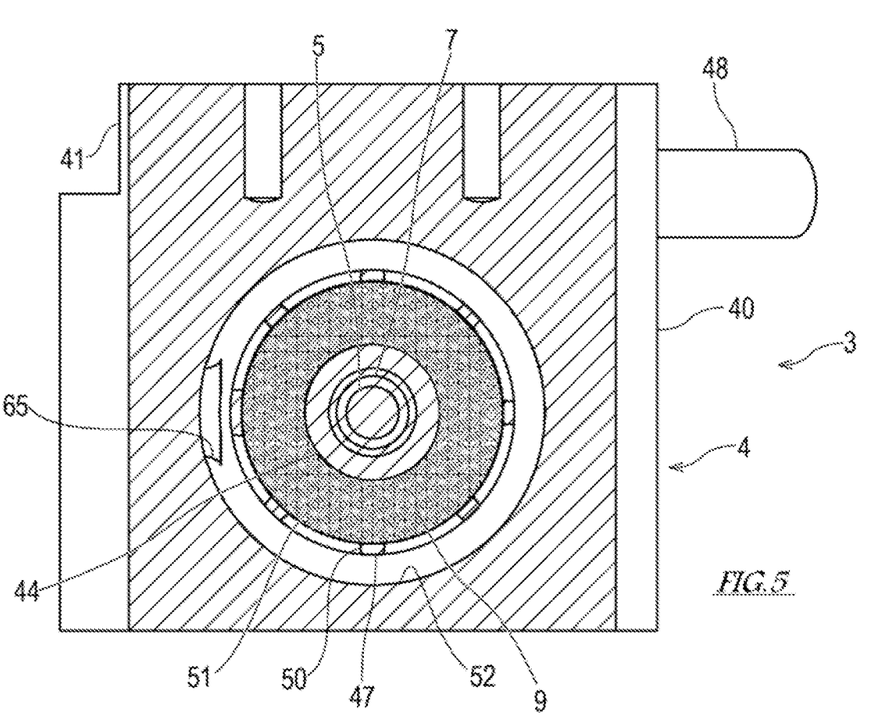
FIG. 5 is a sectional view taken along line V-V of FIG. 4.
Figure 6:
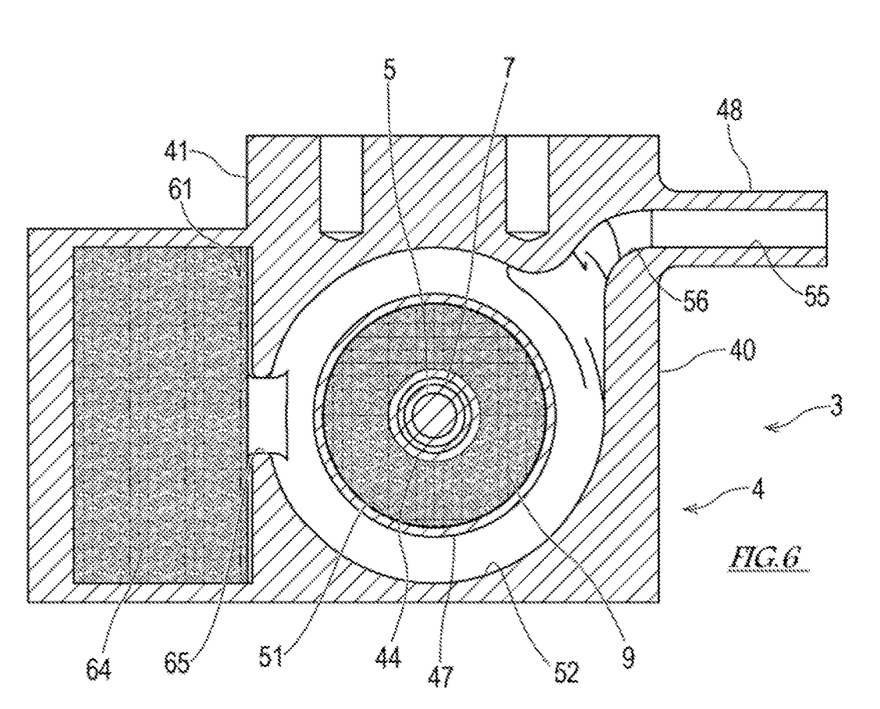
FIG. 6 is a sectional view taken along line VI-VI of FIG. 4.

As shown in FIGS. 3 to 6, the welding torch 3 includes the non-consumable electrode 5, the collet 7 and the torch body 4. The axial direction of the non-consumable electrode 5 is parallel to the radial direction of the tube 10. The non-consumable electrode 5 is inserted into the collet 7, and the collet 7 is inserted into a sleeve 44 formed in the torch body 4. Hereinafter, for convenience of explanation, as shown in FIGS. 3 and 4, the axial direction of the non-consumable electrode 5 may be referred to as the upward (U) and downward (D) direction, (the distal end is downward, the opposite thereof is upward), the axial direction of the tube 10 may be referred to as the forward (F) and back (B) direction, and the direction orthogonal to the above two directions may be referred to as the left (L) and right (R) direction.

The collet 7 includes a hexagonal plate-shaped head 71 orthogonal to the axial direction of the non-consumable electrode 5 and a cylindrical portion 72 extending downward from the head 71, and is formed of an insulator. The non-consumable electrode 5 is inserted in the cylindrical portion 72. The non-consumable electrode 5 inserted into the collet 7 has a distal end of the non-consumable electrode 5, extending from the collet 7. A screw thread 73 is formed on the outer peripheral surface of the cylindrical portion 72. In addition, a slit (not shown) for allowing the diameter to be reduced is formed at the distal end of the cylindrical portion 72.

The torch body 4 integrally includes a base 40 having a substantially rectangular shape when viewed from the radial direction of the tube 10, and a joint portion 48 projecting rightward from the right side of the base 40. A hose (not shown) is connected to the joint portion 48, and an inert gas is supplied to the inert gas flow path (shielding gas flow paths 51 and 52 and an outer gas flow path 61) formed in the base 40 through the hose.

The base 40 integrally includes the sleeve 44 that holds the collet 7, a flow path forming portion 41 forming the shielding gas flow paths 51 and 52 around the sleeve 44 and forming the outer gas flow path 61 communicating with the shielding gas flow paths 51 and 52, a shielding gas nozzle 42 forming a shielding gas guiding space 53 around the distal end of the non-consumable electrode 5 where the distal end extends from the collet 7, a first gas lens 9 that separates the shielding gas flow path 51 from the shielding gas guiding space 53; an outer gas nozzle 63 forming an outer gas guiding space 62, and a second gas lens 64 separating the outer gas flow path 61 from the outer gas guiding space 62.

The sleeve 44 extends parallel to the radial direction of the tube 10 (that is, the axial direction of the non-consumable electrode 5). A threaded groove 46 is formed on the inner peripheral surface of the sleeve 44. The threaded groove 46 is screwed with the screw thread 73 of the collet 7 screwed into the sleeve 44. The distal end (lower end) of the sleeve 44 has a tapered shape that is tapered downward. Due to the tapered shape of the sleeve 44, when the collet 7 is screwed into the threaded groove 46 on the inner periphery of the sleeve 44 in a state where the non-consumable electrode 5 is inserted into the collet 7, the collet 7 is pressurized in the direction of diameter reduction from the distal end of the sleeve 44, so that the non-consumable electrode 5 is held by the collet 7.

The flow path forming portion 41 forms the shielding gas flow paths 51 and 52 around the sleeve 44. The shielding gas flow paths 51 and 52 according to the present embodiment include an inner peripheral flow path 51 and an outer peripheral flow path 52. The inner peripheral flow path 51 is an annular flow path formed around the sleeve 44 and faces the first gas lens 9. The outer peripheral flow path 52 is an annular passage formed around the inner peripheral flow path 51. The outer peripheral flow path 52 is connected to a flow path 55 of the joint portion 48 by a connection flow path 56.

The inner peripheral flow path 51 and the outer peripheral flow path 52 are separated by a partition 47. The partition 47 is provided with a communication port 50 which communicates the inner peripheral flow path 51 and the outer peripheral flow path 52, and allows the inert gas to flow from the outer peripheral flow path 52 to the inner peripheral flow path 51. In the present embodiment, a plurality of communication ports 50 are provided in the partition 47 so as to be dispersed in the circumferential direction, and the inert gas flows from the entire periphery of the inner peripheral flow path 51 into the inside thereof.

Each communication port 50 is provided at the upper portion of the partition 47 and at a position closer to the ceiling of the inner peripheral flow path 51, in other words, at a position further away from the first gas lens 9. The connection flow path 56 is connected to the outer peripheral flow path 52 below the communication port 50. Therefore, the flow of the inert gas flowing from the connection flow path 56 into the outer peripheral flow path 52 comes into contact with the partition 47. This prevents the inert gas from flowing directly into the inner peripheral flow path 51 through the communication port 50.

The ceiling of the inner peripheral flow path 51 is smoothly continuous with the proximal end of the sleeve 44, and the boundary between the proximal end of the sleeve 44 and the ceiling of the inner peripheral flow path 51 is connected with a curved surface. The curved surface portion formed on the wall forming the inner peripheral flow path 51 in this manner functions as a guide portion 54 for deflecting the flow of inert gas flowing from the outer peripheral flow path 52 into the inner peripheral flow path 51 toward the first gas lens 9.

When the outer peripheral flow path 52 is divided in the circumferential direction into two portions consisting of a first portion including an inflow portion of the inert gas and a remaining second portion, the opening ratio of the partition 47 of the second portion is larger than the opening ratio of the partition 47 of the first portion. The inflow portion of the inert gas in the outer peripheral flow path 52 is a connection portion between the outer peripheral flow path 52 and the connection flow path 56.

In the welding torch 3 according to the present embodiment, by making the total opening area (flow path area) of the communication port 50 provided in the partition 47 of the second portion larger than the total opening area (flow path area) of the communication port 50 provided in the partition 47 of the first portion, the opening ratio of the partition 47 of the second portion is made larger than the opening ratio of the partition 47 of the first portion. However, the opening area (flow path area) of each communication port 50 may be the same, and the number of the communication ports 50 provided in the partition 47 of the second portion may be larger than the number of the communication ports 50 provided in the partition 47 of the first portion.

The shielding gas nozzle 42 is provided below the flow path forming portion 41. In the present embodiment, the inner peripheral wall of the shielding gas nozzle 42 and the partition 47 are continuous in the axial direction of the non-consumable electrode 5. The distal end (lower end) of the shielding gas nozzle 42 is located above the distal end of the non-consumable electrode 5 and below the distal end of the sleeve 44. The distal end of the shielding gas nozzle 42 is curved along the outer peripheral surface of the facing tubes 10.

The shielding gas guiding space 53 is formed on the inner peripheral side of the shielding gas nozzle 42. In the shielding gas guiding space 53, the inert gas as the shielding gas flowing out of the first gas lens 9 is straightened so as to flow in a laminar flow parallel to the extending direction of the shielding gas nozzle 42, that is, the axial direction of the non-consumable electrode 5 without being diffused.

The first gas lens 9 straightens the inert gas in a laminar flow, and separates the inner peripheral flow path 51 from the shielding gas guiding space 53. The first gas lens 9 has a hollow disk shape centered on the non-consumable electrode 5. The inner peripheral portion of the first gas lens 9 is connected to the outer peripheral surface of the distal end of the sleeve 44, and the outer peripheral portion of the first gas lens 9 is connected to the inner peripheral surface of the shielding gas nozzle 42 (or the inner peripheral surface of the partition 47).

The flow path forming portion 41 also forms the outer gas flow path 61 communicating with the shielding gas flow paths 51 and 52. In the present embodiment, the outer gas flow path 61 is connected to the outer peripheral flow path 52 among the inner and outer shielding gas flow paths 51 and 52.

When the outer peripheral flow path 52 is divided in the circumferential direction into two portions consisting of the first portion including the inflow portion of the inert gas and the remaining second portion, the outer gas flow path 61 is connected to the second portion of the outer peripheral flow path 52. The inflow portion of the inert gas in the outer peripheral flow path 52 is a connection portion between the outer peripheral flow path 52 and the connection flow path 56. In other words, in the outer peripheral flow path 52, the portion to which the connection flow path 56 is connected and the portion to which the outer gas flow path 61 is connected are opposite with respect to the non-consumable electrode 5. Thus, the inert gas flowing from the outside into the shielding gas flow paths 51 and 52 can be prevented from immediately flowing to the outer gas guiding space 62.

The outer gas flow path 61 and the outer peripheral flow path 52 are in communication with each other via a communication port 65. The flow path area of the communication port 65 is smaller than the flow path area of the outer gas flow path 61. The flow path area of the outer gas flow path 61 has the substantially same dimension in the forward and rearward direction as the second gas lens 64 in FIG. 3, and has the substantially same dimension in the vertical direction as the outer peripheral flow path 52 in FIG. 4. As described above, the communication port 65, which is an inlet through which the inert gas flows from the outer peripheral flow path 52 to the outer gas flow path 61, is narrowed, so that it is possible to provide flow resistance to the inert gas which flows from the outer peripheral flow path 52 to the outer gas flow path 61. As a result, the inert gas present in the outer peripheral flow path 52 preferentially flows into the shielding gas flow path 51 rather than into the outer gas flow path 61.

The outer gas nozzle 63 is provided downstream of the shielding gas nozzle 42 in the traveling direction of the welding torch 3. While the shielding gas nozzle 42 is provided around the non-consumable electrode 5 so as to spray the inert gas onto the molten pool, the outer gas nozzle 63 is provided adjacent to the shielding gas nozzle 42 so as to spray the inert gas onto the bead where the molten pool has melted and solidified (or while solidifying) during welding.

The outer gas nozzle 63 extends in the radial direction of the tube 10. The outer gas guiding space 62 is formed on the inner peripheral side of the outer gas nozzle 63. In the outer gas guiding space 62, the inert gas as the outer gas (outer shielding gas) that has flowed out of the second gas lens 64 is straightened so as to flow in a laminar flow parallel to the extending direction of the outer gas guiding space 62, that is, the radial direction of the tube 10 without being diffused. In the present embodiment, while the outlet of the shielding gas nozzle 42 is circular, the outlet of the outer gas nozzle 63 is rectangular. Further, while the inner diameter of the shielding gas nozzle 42 is substantially constant, the outer gas nozzle 63 expands in diameter toward the distal end.

The second gas lens 64 straightens the inert gas in a laminar flow, and separates the outer gas flow path 61 from the outer gas guiding space 62. The second gas lens 64 has a rectangular block shape.

In addition, the torch body 4 according to the present embodiment consists of conductive metals, and is manufactured by metal 3D printer. However, the joint portion 48 does not necessarily have to be integrally formed on the torch body 4, and may be joined to the torch body 4 by welding or a screw structure. When the torch body 4 is manufactured with the metal 3D printer, a laser beam is radiated onto the metal powder as a raw material, for example. The radiation of the laser light melts the metal powder and fuses the molten metal powder to produce a solid structure. The material of the metal powder is, for example, copper and copper alloy, steel, stainless steel, aluminum, titanium, nickel alloy and the like.

In the welding torch 3 configured as described above, the inert gas guided through the flow path 55 of the joint portion 48 first flows into the outer peripheral flow path 52 through the connection flow path 56. The inert gas diffused to the outer peripheral flow path 52 flows into the inner peripheral flow path 51 through the communication port 50. The flow of the inert gas flowing into the inner peripheral flow path 51 is directed from the communication port 50 to the sleeve 44, comes into contact with the guide portion 54 located at the boundary between the ceiling of the inner peripheral flow path 51 and the sleeve 44, and is guided to the curved surface of the guide portion 54 to change its direction, and goes to the first gas lens 9. The inert gas is straightened while passing through the first gas lens 9 to form a laminar flow and flows out to the shielding gas guiding space 53 to spout, as the shielding gas, from the distal end of the shielding gas nozzle 42 toward the molten pool and the vicinity of the tube 10. Further, the inert gas diffused to the outer peripheral flow path 52 flows into the outer gas flow path 61 through the communication port 65. The inert gas that has flowed into the outer gas flow path 61 is straightened while passing through the second gas lens 64, and to form a laminar flow and flows out to the outer gas guiding space 62 to spout, as the outer gas, from the distal end of the outer gas nozzle 63 toward the bead of the tube 10.

[Configuration of First Gas Lens 9 and Second Gas Lens 64]

Figure 7:
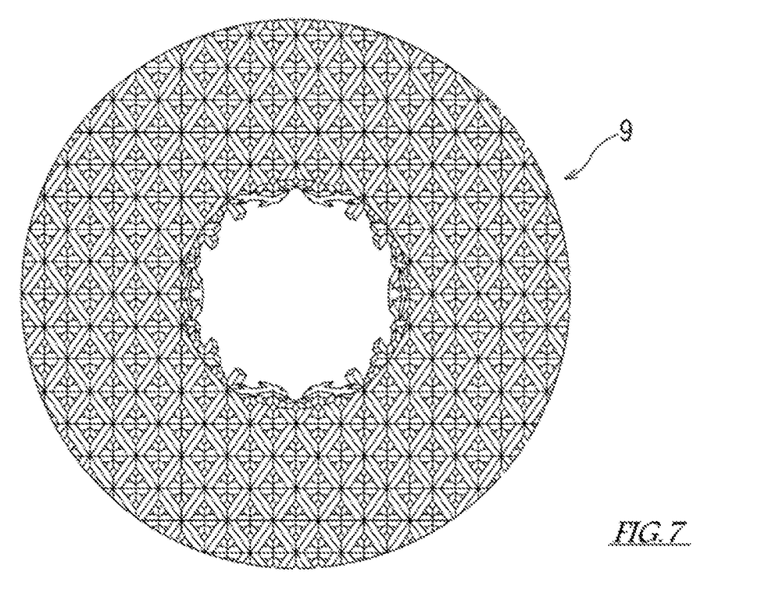
FIG. 7 is a plan view of a gas lens.
Figures 8, 9:
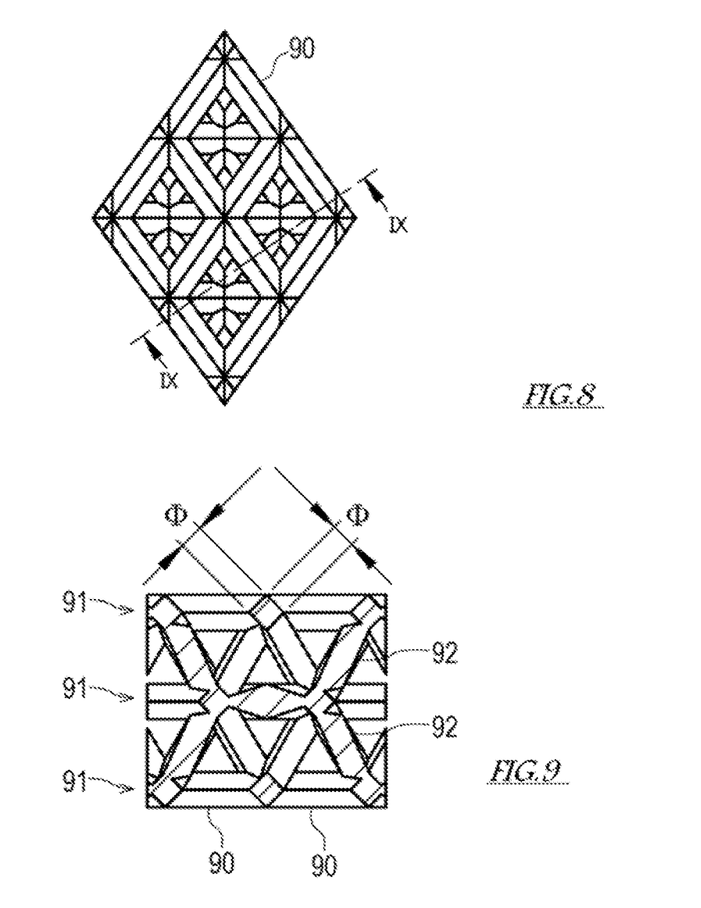
FIG. 8 is a partial enlarged plan view of the gas lens.
FIG. 9 is a sectional view taken along line IX-IX in FIG. 8.
Figure 10:
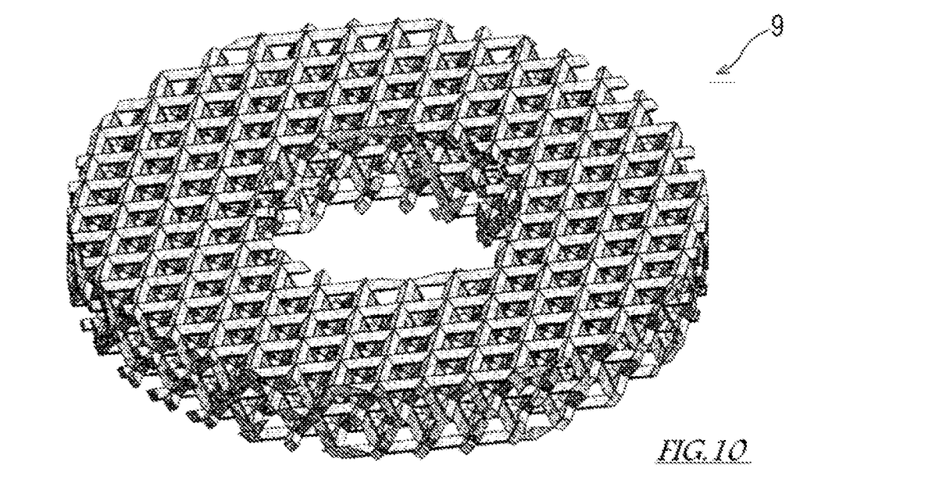
FIG. 10 is a perspective view of the gas lens.

Here, the configuration of the first gas lens 9 and the second gas lens 64 will be described in detail. FIG. 7 is a plan view of the first gas lens 9, FIG. 8 is a partial enlarged plan view of the first gas lens 9, FIG. 9 is a sectional view taken along line IX-IX of FIG. 8, and FIG. 10 is a perspective view of a gas lens.

As shown in FIGS. 7 to 10, the first gas lens 9 has a lattice structure. In other words, the first gas lens 9 is a three-dimensional mesh lattice in which elongated beams 90 and 92 are joined in a three-dimensional manner. Note that the diameter $\Phi$ of the elongated beams 90 and 92 forming the lattice structure is about 0.2 mm at the minimum so that the elongated beams 90 and 92 can be manufactured by a metal 3D printer.

In the first gas lens 9 according to the present embodiment, mesh sheets 91 formed by joining cross beams 90 in a planar manner are stacked in the axial direction of the non-consumable electrode 5 with different phases. Furthermore, the lattice points of the mesh sheets 91 vertically stacked are joined by vertical beams 92. The first gas lens 9 having such a lattice structure has regular gaps formed by the beams 90 and 92. In FIG. 8, a lattice of four cells of the mesh sheet 91 is shown, and a state in which a plurality of the mesh sheets 91 are stacked in the thickness direction with different phases is shown. Further, in FIG. 9, a three-dimensional mesh lattice is apparent in which the lattice points of the mesh sheets 91 are joined together by oblique vertical beams 92.

In the first gas lens 9 configured as described above, the inner peripheral portion of the first gas lens 9 connected to the distal end of the sleeve 44 is required to have high rigidity compared with the remaining portion of the first gas lens 9 in order to withstand the pressure from the collet 7 screwed into the sleeve 44. Therefore, the porosity of the inner peripheral portion of the first gas lens 9, in particular, the porosity of the coupling portion with the sleeve 44, is kept at a low value (for example, 10% or less), compared with the remaining portion of the gas lens 9. The porosity can be determined from the apparent volume and the true density of the constituent material of the gas lens 9.

The second gas lens 64 has a lattice structure similar to that of the first gas lens 9. That is, the second gas lens 64 is a three-dimensional mesh lattice in which elongated beams are joined in a three-dimensional manner. Note that the diameter $\Phi$ of the elongated beam forming the lattice structure is about 0.2 mm at the minimum so that the elongated beam can be manufactured by a metal 3D printer.

Further, in the second gas lens 64 according to the present embodiment, as in the first gas lens 9, the mesh sheets formed by joining cross beams in a planar manner are stacked in the radial direction of the tube 10 with different phases. Furthermore, the lattice points of the mesh sheets vertically stacked are joined by the vertical beams.

The porosity of the second gas lens 64 is the same as the porosity of the first gas lens 9 or lower than the porosity of the first gas lens 9. If the porosity of the second gas lens 64 is lower than the porosity of the first gas lens 9, the flow resistance of the inert gas in the second gas lens 64 is higher than that in the first gas lens 9, and the inert gas flows preferentially to the first gas lens 9 over the second gas lens 64.

As explained above, the welding torch 3 according to the present embodiment includes the torch body 4 including the flow path forming portion 41 that forms the shielding gas flow paths 51 and 52 into which an inert gas flows and the outer gas flow path 61 communicating with the shielding gas flow paths 51 and 52, the first gas lens 9 that straightens the inert gas in the shielding gas flow path 51 and blows the inert gas out as a shielding gas, and the second gas lens 64 that straightens the inert gas in the outer gas flow path 61 and blows the inert gas out as an outer gas.

Further, the all-position welding device 1 of the present embodiment includes the welding torch 3 and the rotation mechanism 2 for rotating the welding torch 3 around the tube 10.

In the welding torch 3 and the all-position welding device 1, the shielding gas flow paths 51 and 52 and the outer gas flow path 61 communicate with each other, and part of the inert gas supplied to the welding torch 3 as the shielding gas is used as the outer gas. That is, the inert gas supplied to the welding torch 3 is carried to the outer gas flow path 61 using part or all of the shielding gas flow paths 51 and 52. In this way, since the shielding gas flow paths 51 and 52 and the outer gas flow path 61 are not independent, the gas flow path can be shortened by sharing the flow path, and further, the joint portion connected to the hose for the outer gas can be omitted, so that the welding torch 3 including the outer gas nozzle 63 can be miniaturized.

Further, in the welding torch 3 of the present embodiment, the shielding gas flow paths 51 and 52 have an annular shape, and when the shielding gas flow paths 51 and 52 are divided in the circumferential direction into two portions consisting of the first portion including the inflow portion of the inert gas, and the remaining second portion, the outer gas flow path 61 is connected to the second portion of the shielding gas flow paths 51 and 52.

Thus, in the shielding gas flow paths 51 and 52, the inflow portion of the inert gas (that is, the portion to which the connection flow path 56 is connected) and the portion to which the outer gas flow path 61 is connected are opposite with respect to the non-consumable electrode 5. Thus, the inert gas flowing from the outside into the shielding gas flow paths 51 and 52 can be prevented from immediately flowing to the outer gas guiding space 62.

The welding torch 3 of the present embodiment further includes the non-consumable electrode 5 and the collet 7 into which the non-consumable electrode 5 is inserted. The torch body 4 further includes the sleeve 44 that holds the collet 7, the shielding gas nozzle 42 forming the shielding gas guiding space 53 around the distal end of the non-consumable electrode 5 where the distal end extends from the collet 7, and the outer gas nozzle 63 forming the outer gas guiding space 62 around the shielding gas nozzle 42. The flow path forming portion 41 of the torch body 4 forms the shielding gas flow paths 51 and 52 around the sleeve 44, the first gas lens 9 is disposed to separate the shielding gas flow path 51 from the shielding gas guiding space 53, and the second gas lens 64 is disposed to separate the outer gas flow path 61 from the outer gas guiding space 62.

Furthermore, in the welding torch 3, the shielding gas flow paths 51 and 52 and the outer gas flow path 61 communicate with each other through the communication port 65 having the flow path area smaller than the flow path area of the outer gas flow path 61.

As described above, since the communication port 65, which is the inlet through which the inert gas flows into the outer gas flow path 61, is narrowed, so that it is possible to provide flow resistance to the inert gas which flows from the shielding gas flow paths 51 and 52 to the outer gas flow path 61. As a result, the inert gas in the shielding gas flow paths 51 and 52 flows preferentially to the shielding gas guiding space 53 over the outer gas guiding space 62. That is, the shielding gas preferentially spouts over the outer gas. Therefore, even if the outer gas and the shielding gas share the flow path, the stable spout of the shielding gas is not impeded.

Moreover, in the welding torch 3 of this embodiment, the shielding gas flow paths 51 and 52 include the inner peripheral flow path 51 formed around the sleeve 44 and facing the first gas lens 9, and the outer peripheral flow path 52 formed around the inner peripheral flow path 51 and separated by the partition 47 provided with the communication port 50, and the outer gas flow path 61 is in communication with the outer peripheral flow path 52.

In this way, by forming the shielding gas flow paths 51 and 52 into an inner/outer double structure of the inner peripheral flow path 51 and the outer peripheral flow path 52 provided on the outer peripheral side of the inner peripheral flow path 51, the inert gas can be sufficiently laminarized even if the dimension (that is, the thickness) in the direction parallel to the axial direction of the non-consumable electrode 5 of the torch body 4 is reduced. As a result, the welding torch 3 can be flattened, that is, the thickness can be reduced, compared with the case where the shielding gas flow path is a single space.

Further, in the welding torch 3 of the present embodiment, when the outer peripheral flow path 52 is divided in the circumferential direction into two portions consisting of the first portion including the inflow portion of the inert gas and the remaining second portion, the opening ratio of the partition 47 of the second portion is larger than the opening ratio of the partition 47 of the first portion. Here, the inflow portion of the inert gas in the outer peripheral flow path 52 is the connection portion between the outer peripheral flow path 52 and the connection flow path 56.

As described above, by making the opening ratio of the partition 47 of the second portion larger than the opening ratio of the partition 47 of the first portion of the outer peripheral flow path 52, the inert gas that has flowed into the first portion of the outer peripheral flow path 52 is likely to spread around the second portion, so that the inert gas can be diffused in the outer peripheral flow path 52.

Further, in the welding torch 3 of the present embodiment, the second gas lens 64 has a lattice structure.

As described above, by forming the second gas lens 64 in a lattice structure, the second gas lens 64 formed by using a 3D printer has regular gaps. Therefore, the porosity of the second gas lens 64 is stabilized, compared with the case where the second gas lens 64 is a porous body. Therefore, the improvement of the yield of the welding torch 3 provided with the second gas lens 64 is expected.

The second gas lens 64 of the welding torch 3 of the present embodiment has a structure in which mesh sheets each formed by joining a plurality of beams in a planar manner are stacked in different phases. The lattice points of the stacked mesh sheets are joined together by the vertical beams.

In the above embodiment, the second gas lens 64 of the welding torch 3 has a three-dimensional mesh lattice structure in which the cross beams and the vertical beams are joined together, but the present invention is not limited to this. The second gas lens 64 may have a lattice structure that can form regular gaps using a 3D printer. For example, the second gas lens 64 may have a structure in which mesh sheets in which a plurality of beams are joined in a planar manner are superimposed in several layers with different phases. However, as in the present embodiment, the vertical beams connecting the lattice points are provided between the layers of the mesh sheets, so that the inert gas passing through the second gas lens 64 is straightened by not only the cross beams but also the vertical beams of the lattice structure. Therefore, compared with the case where the vertical beam is not provided, the same straightening effect can be obtained even if the number of stacked mesh sheets is reduced. In other words, compared with the case where the vertical beam is not provided, the number of stacked mesh sheets can be reduced, and the thickness of the second gas lens 64 (that is, the dimension parallel to the radial direction of the tube 10) can be suppressed.

Further, in the welding torch 3 according to the present embodiment, the second gas lens 64 is integrally formed with the torch body 4. In the present embodiment, the torch body 4 may be formed by a metal 3D printer.

As described above, the welding torch 3 in which a solid metal portion and the second gas lens 64 having a higher porosity than that of the solid metal portion are combined with one torch body 4 using the forming technology using the metal 3D printer can be manufactured inexpensively.

[Modification]

Although the preferred embodiment of the present invention has been described above, it is also possible to include modifications of the specific structure and/or function of the above embodiment in detail without departing from the spirit of the present invention. The above configuration can be modified, for example, as follows.

For example, in the above embodiment, the shielding gas flow paths 51 and 52 have an inner/outer double structure, but may have a single structure. When the shielding gas flow paths 51 and 52 have a single structure, it is desirable to provide an obstruction in the inert gas flow path so that the inert gas flowing into the shielding gas flow paths 51 and 52 does not flow directly to the first gas lens 9 (the shielding gas guiding space 53).

Figure 11:
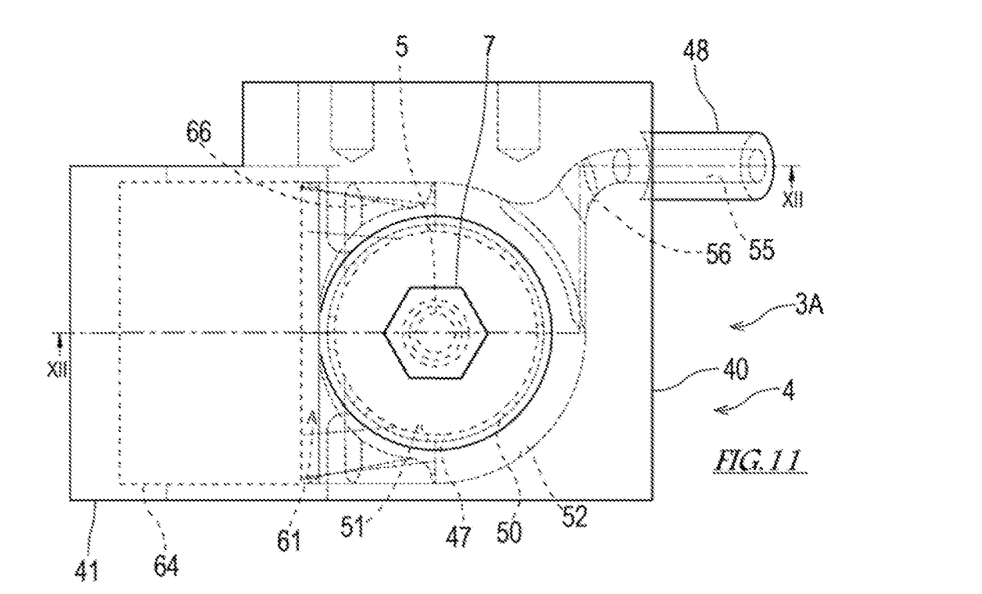
FIG. 11 is a plan view of a welding torch according to a first modification.
Figure 12:
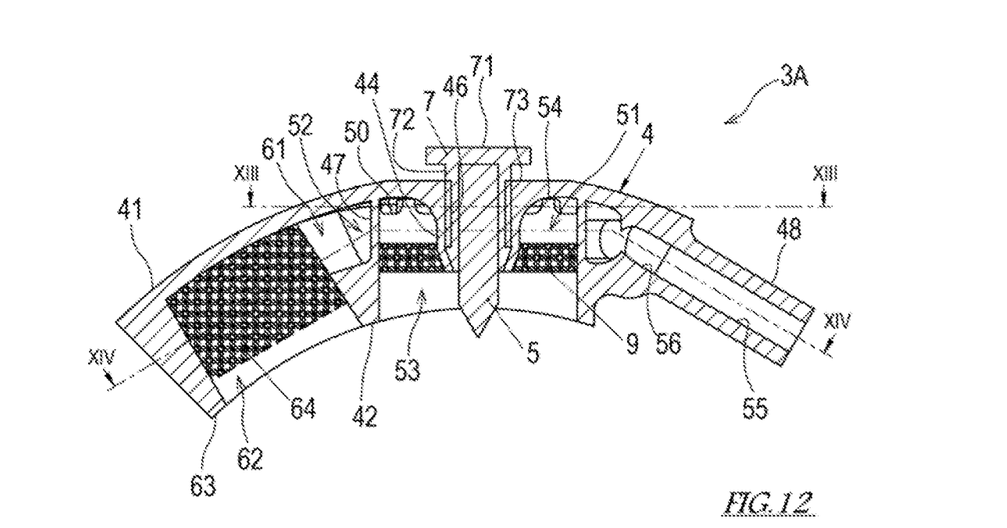
FIG. 12 is a sectional view taken along line XII-XII of FIG. 11.
Figure 13:
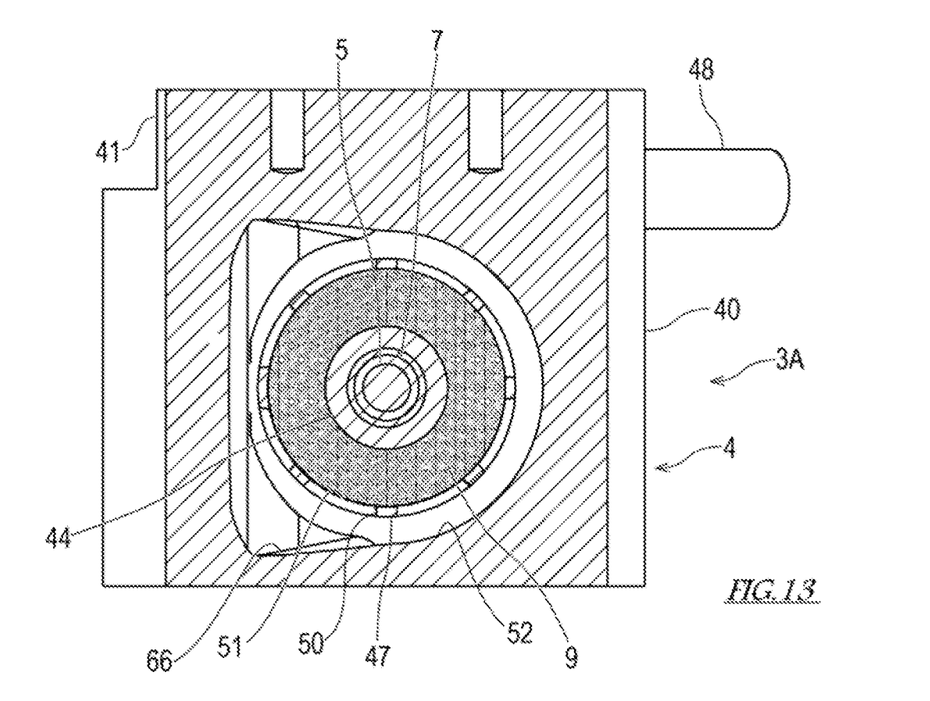
FIG. 13 is a sectional view taken along line XIII-XIII of FIG. 12.
Figure 14:
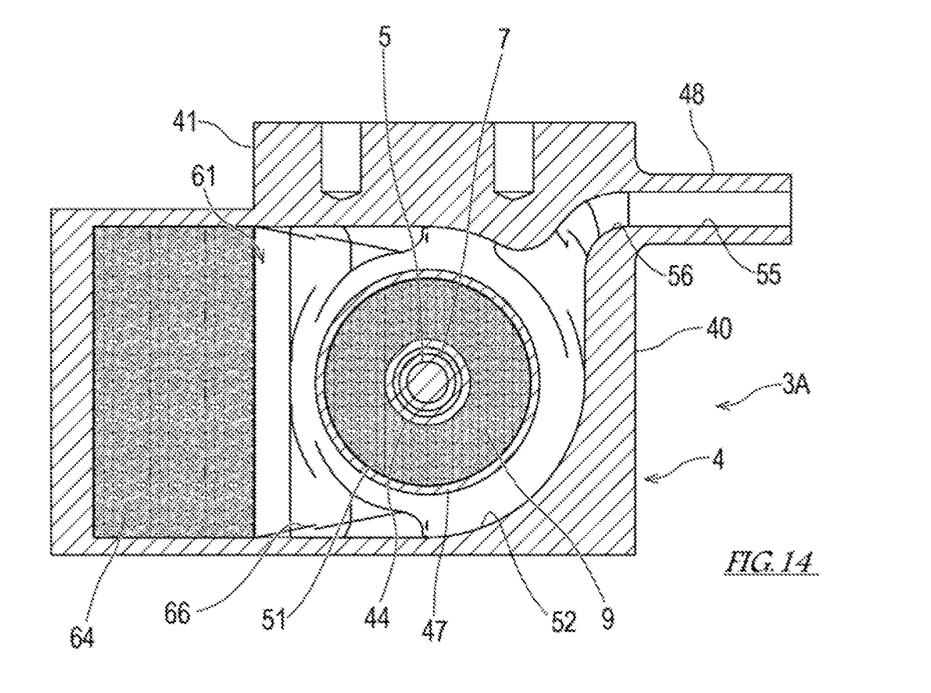
FIG. 14 is a sectional view taken along line XIV-XIV of FIG. 12.

Also, for example, in the above embodiment, by narrowing the flow path area of the communication port 65, the inert gas is made to flow preferentially to the shielding gas guiding space 53 over the outer gas guiding space 62, but flow resistance may be given to the inert gas which is to flow to the outer gas guiding space 62 in a different manner. FIG. 11 is a plan view of a welding torch 3A according to a first modification, FIG. 12 is a sectional view taken along line XII-XII in FIG. 11, FIG. 13 is a sectional view taken along line XIII-XIII in FIG. 12, and FIG. 14 is a sectional view taken along line XIV-XIV of FIG. 12.

In the welding torch 3A according to the first modification shown in FIGS. 11 to 14, the outer peripheral flow path 52 and the outer gas flow path 61 among the shielding gas flow paths 51 and 52 are connected to the connection flow path 66. Although the flow path area of the connection flow path 66 is smaller than the flow path area of the outer gas flow path 61, the space between the outer peripheral flow path 52 and the outer gas flow path 61 is not narrowed. In the welding torch 3A, the porosity of the second gas lens 64 is sufficiently smaller than the porosity of the first gas lens 9 within a range (for example, 30 to 60%) through which inert gas can pass. With this configuration, the flow resistance of the inert gas passing through the second gas lens 64 is greater than the flow resistance of the inert gas passing through the first gas lens 9, and the inert gas supplied to the welding torch 3 flows preferentially to the shielding gas guiding space 53 over the outer gas guiding space 62. Thus, the stable spout of the shielding gas is not impeded.

Further, for example, in the above embodiment, the communication port 65 communicating the shielding gas flow paths 51 and 52 and the outer gas flow path 61 is a hole whose flow path area is narrowed, but the aspect of the communication port 65 is not limited to this. The communication port 65 may be one or more slits. Also, for example, the communication port 65 may be provided with an obstacle such as a swirl vane 67.

REFERENCE SIGNS LIST

1 all-position welding device
2 rotation mechanism
3, 3A welding torch
4 torch body
5 non-consumable electrode
7 collet
9 first gas lens
10 tube
11 base plate
12, 14, 16 linear motion mechanism
18 clamp mechanism
20 table
21 rotating member
22 to 24 driven gear
25 drive gear
26 motor
40 base
41 flow path forming portion
42 shielding gas nozzle
44 sleeve
46 threaded groove
47 partition
48 joint portion
50 communication port
51 inner peripheral flow path (shielding gas flow path)
52 outer peripheral flow path (shielding gas flow path)
53 shielding gas guiding space
54 guide portion
55 flow path
56 connection flow path
61 outer gas flow path
62 outer gas guiding space
63 outer gas nozzle
64 second gas lens
65 communication port
66 connection flow path
67 swirl vane
71 head
72 cylindrical portion
73 screw thread 90, 92 beam
91 mesh sheet

The invention claimed is:

1. A welding torch comprising a torch body including:
a shielding gas flow path into which an inert gas flows;
an outer gas flow path communicating with the shielding gas flow path;
a first gas lens that straightens the inert gas in the shielding gas flow path and blows the inert gas out as a shielding gas; and
a second gas lens that straightens the inert gas in the outer gas flow path and blows the inert gas out as an outer gas, wherein
porosity of the second gas lens is lower than porosity of the first gas lens,
the shielding gas flow path has an annular shape,
an inflow portion through which the inert gas flows into the shielding gas flow path is open on an outer peripheral wall of the shielding gas flow path, and
when the shielding gas flow path is divided in a circumferential direction into two portions consisting of a first portion including the inflow portion of the inert gas and a remaining second portion, the outer gas flow path is connected to the second portion of the shielding gas flow path.

2. A welding torch comprising a torch body including:
a shielding gas flow path into which an inert gas flows;
an outer gas flow path communicating with the shielding gas flow path;
a first gas lens that straightens the inert gas in the shielding gas flow path and blows the inert gas out as a shielding gas; and
a second gas lens that straightens the inert gas in the outer gas flow path and blows the inert gas out as an outer gas, wherein
the shielding gas flow path has an annular shape,
an inflow portion through which the inert gas flows into the shielding gas flow path is open on an outer peripheral wall of the shielding gas flow path,
when the shielding gas flow path is divided in a circumferential direction into two portions consisting of a first portion including the inflow portion of the inert gas and a remaining second portion, the outer gas flow path is connected to the second portion of the shielding gas flow path.

3. The welding torch according to claim 2,
wherein the shielding gas flow path and the outer gas flow path are in communication with each other through a communication port having a flow path area smaller than a flow path area of the outer gas flow path.

4. The welding torch according to claim 2, further comprising:
a non-consumable electrode; and
a collet into which the non-consumable electrode is inserted, wherein
the torch body includes
a sleeve that holds the collet,
a shielding gas guiding space around a distal end of the non-consumable electrode, the distal end extending from the collet,
a shielding gas nozzle surrounding an outer periphery of the shielding gas guiding space,
an outer gas guiding space around the shielding gas nozzle, and
an outer gas nozzle surrounding an outer periphery of the outer gas guiding space,
the shielding gas flow path surrounds an outer periphery of the sleeve and has an annular shape about the non-consumable electrode,
an inflow portion through which the inert gas flows into the shielding gas flow path is open on an outer peripheral wall of the shielding gas flow path,
the outer gas flow path communicates with the shielding gas flow path through a communication port on the outer peripheral wall of the shielding gas flow path,
the first gas lens is configured to separate the shielding gas flow path from the shielding gas guiding space, and
the second gas lens is configured to separate the outer gas flow path from the outer gas guiding space.

5. The welding torch according to claim 4,
wherein the shielding gas flow path includes an inner peripheral flow path formed around the sleeve and facing the first gas lens, and an outer peripheral flow path formed around the inner peripheral flow path and separated by a partition with a communication port, and
wherein the outer gas flow path is in communication with the outer peripheral flow path.

6. An all-position welding device configured to perform butt welding of tubes, the all-position welding device comprising:
the welding torch according to claim 2; and
a rotation mechanism for rotating the welding torch around the tubes.

7. An all-position welding device configured to perform butt welding of tubes, the all-position welding device comprising:
the welding torch according to claim 4; and
a rotation mechanism for rotating the welding torch around the tubes,
wherein the outer gas nozzle is downstream of the shielding gas nozzle in a traveling direction of the welding torch,
wherein the outer gas nozzle extends in a radial direction of the tube, and
wherein a shielding gas having flowed through the outer gas flow path into the second gas lens in a circumferential direction of the tube is straightened by the second gas lens and the outer gas nozzle so as to flow in a laminar flow parallel to the radial direction of the tube.

* * * * *